(12) United States Patent
Tachibanada

(10) Patent No.: US 9,995,369 B2
(45) Date of Patent: Jun. 12, 2018

(54) AUTOMATIC TRANSMISSION

(71) Applicant: Honda Motor Co., Ltd., Tokyo (JP)

(72) Inventor: Yuya Tachibanada, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days. days.

(21) Appl. No.: 15/458,996

(22) Filed: Mar. 15, 2017

(65) Prior Publication Data

US 2017/0268634 A1    Sep. 21, 2017

(30) Foreign Application Priority Data

Mar. 15, 2016 (JP) ................. 2016-051479

(51) Int. Cl.
*F16H 3/66* (2006.01)
*F16D 41/12* (2006.01)

(52) U.S. Cl.
CPC ............ *F16H 3/66* (2013.01); *F16D 41/125* (2013.01); *F16H 2200/0069* (2013.01); *F16H 2200/2012* (2013.01); *F16H 2200/2046* (2013.01); *F16H 2200/2066* (2013.01); *F16H 2200/2082* (2013.01)

(58) Field of Classification Search
None
See application file for complete search history.

(56) References Cited

U.S. PATENT DOCUMENTS 9,429,226 B2 * 8/2016 Ike ................. F16H 57/082

FOREIGN PATENT DOCUMENTS

JP       2014196823       10/2014

* cited by examiner

*Primary Examiner* — Dirk Wright
(74) *Attorney, Agent, or Firm* — JCIPRNET

(57) ABSTRACT

In an automatic transmission, the control part controls the engaging mechanisms and recognizes the rotational speed of a drive source and a stop request for the drive source. The automatic transmission changes the rotational speed of the input member to transmission gear ratios by the planetary gear mechanism and the engaging mechanisms so as to freely output the rotation from the output member. The engaging mechanisms include a switching mechanism switchable between a fixed state and a reverse rotation preventing state in which a normal rotation of a corresponding element among the elements of the planetary gear mechanism is allowed and a reverse rotation thereof is prevented. The control part switches the switching mechanism in a state in which the stop request for the drive source is not recognized and the rotational speed of the drive source is equal to or greater than a predetermined value.

4 Claims, 11 Drawing Sheets

|      | B1  | B2 | B3 | B4 | C1 | C2 | C3 | Transmission ratio | Common ratio |
|------|-----|----|----|----|----|----|----|---|---|
| Rvs  | F   |    | ○  |    |    | ○  |    | 4.008 |       |
| 1st  | R/F | ○  | ○  |    |    |    |    | 5.233 |       |
|      |     |    |    |    |    |    |    |       | 1.554 |
| 2nd  | R   | ○  | ○  |    |    |    | ○  | 3.367 |       |
|      |     |    |    |    |    |    |    |       | 1.465 |
| 3rd  | R   | ○  | ○  |    |    | ○  |    | 2.298 |       |
|      |     |    |    |    |    |    |    |       | 1.348 |
| 4th  | R   | ○  |    |    |    | ○  | ○  | 1.705 |       |
|      |     |    |    |    |    |    |    |       | 1.251 |
| 5th  | R   | ○  |    |    | ○  | ○  |    | 1.363 |       |
|      |     |    |    |    |    |    |    |       | 1.363 |
| 6th  | R   |    |    |    | ○  | ○  | ○  | 1.000 |       |
|      |     |    |    |    |    |    |    |       | 1.273 |
| 7th  | R   |    | ○  |    | ○  | ○  |    | 0.786 |       |
|      |     |    |    |    |    |    |    |       | 1.196 |
| 8th  | R   |    | ○  |    | ○  |    | ○  | 0.657 |       |
|      |     |    |    |    |    |    |    |       | 1.126 |
| 9th  | R   |    | ○  | ○  | ○  |    |    | 0.584 |       |
|      |     |    |    |    |    |    |    |       | 1.120 |
| 10th | R   |    |    | ○  | ○  |    | ○  | 0.520 |       |

AUTOMATIC TRANSMISSION

CROSS-REFERENCE TO RELATED APPLICATION

This application claims the priority benefit of Japan Application no. 2016-051479, filed on Mar. 15, 2016. The entirety of the above-mentioned patent application is hereby incorporated by reference herein and made a part of this specification.

BACKGROUND OF THE DISCLOSURE

Field of the Disclosure

The disclosure relates to an automatic transmission including a planetary gear mechanism and an engaging mechanism.

Description of the Related Art

Conventionally, an automatic transmission is known including a planetary gear mechanism that has a plurality of elements rotatable inside a casing, and a plurality of engaging mechanisms switchable between a coupled state of coupling the elements to one another and a fixed state of fixing the elements to the casing.

In this type of automatic transmission, a switching mechanism (e.g., a two-way clutch) switchable between a reverse rotation preventing state of allowing normal rotation of the elements of the planetary gear mechanism and preventing reverse rotation thereof and the fixed state is known to be used as the engaging mechanism (e.g., see Patent Document 1).

PRIOR-ART DOCUMENTS

Patent Documents

Patent Document 1: Japanese Patent Publication No. 2014-196823

SUMMARY OF THE DISCLOSURE

Problems to Be Solved by the Disclosure

By the way, in the conventional automatic transmission as described in Patent Document 1, if switching of the switching mechanism is performed immediately before a stop of a drive source, there is a risk that transmission of a driving force to the switching mechanism is stopped before the switching is completed, and the switching may become incomplete.

In that case, there is a risk that, when the drive source is driven again, components of the switching mechanism abut each other in postures different from usual, and a great load may be applied locally to these components. In addition, there is a risk that the switching mechanism is switched to the fixed state despite occurrence of difference rotation in the switching mechanism, and great impact may be applied to the switching mechanism.

The disclosure is made in view of the above points, and provides an automatic transmission in which a great load or impact is unlikely to be applied to the switching mechanism when the drive source is driven again.

Means for Solving the Problems

To achieve the above, the automatic transmission of the disclosure is an automatic transmission including: an input member disposed inside a casing and rotated by a driving force transmitted from a drive source; a planetary gear mechanism having a plurality of elements rotatable inside the casing; a plurality of engaging mechanisms switchable between a coupled state in which the elements are coupled to one another and a fixed state in which the elements are fixed to the casing; an output member outputting a rotation; and a control part controlling the engaging mechanisms and recognizing a rotational speed of the drive source and a stop request for the drive source, wherein the automatic transmission is capable of outputting the rotation of the input member to the output member while changing speed in a plurality of gear positions with the planetary gear mechanism and the engagement mechanisms, and the automatic transmission is characterized in that the plurality of engaging mechanisms include a switching mechanism switchable between the fixed state and a reverse rotation preventing state in which a normal rotation of a corresponding element among the plurality of elements is allowed and a reverse rotation thereof is prevented; and the control part switches the switching mechanism in a state in which the stop request for the drive source is not recognized and the rotational speed of the drive source is equal to or greater than a predetermined value.

In this way, the control part of the automatic transmission of the disclosure switches the switching mechanism in the state in which the stop request for the drive source is not recognized and the rotational speed of the drive source is equal to or greater than the predetermined value. Herein, the predetermined value of the rotational speed of the drive source may be a rotational speed of, e.g., about 500 rpm, at which the drive source is unlikely to stop even if the rotational speed is maintained.

In the automatic transmission of the disclosure, since switching of the switching mechanism is performed in such state, transmission of a driving force to the switching mechanism will not be stopped before the switching is completed, and the switching is prevented from becoming incomplete.

Accordingly, according to the automatic transmission of the disclosure, even if the drive source is driven again, since the components of the switching mechanism are prevented from abutting each other in postures different from usual, a great load will not be applied locally to these components. In addition, since it is prevented that the switching mechanism is switched to the fixed state despite occurrence of difference rotation in the switching mechanism, great impact will not be applied to the switching mechanism.

In addition, in the automatic transmission of the disclosure, the control part preferably switches the switching mechanism from the fixed state to the reverse rotation preventing state in a state in which a load being applied to the switching mechanism is equal to or less than a predetermined value.

With such configuration, it is prevented that switching of the switching mechanism is performed in a state in which a great force is being applied to the components of the switching mechanism. As a result, not only when the drive source is driven again but also during normal switching of the switching mechanism, a load greater than usual is unlikely to be applied to the switching mechanism. Herein, the predetermined value of the load being applied to the switching mechanism may be a negligibly small value, e.g., 0, as compared to a load applied to the switching mechanism during switching.

In addition, in the automatic transmission of the disclosure, the control part preferably switches the switching mechanism from the reverse rotation preventing state to the fixed state in a state in which difference rotation of the switching mechanism is equal to or less than a predetermined value.

With such configuration, not only when the drive source is driven again but also during normal switching of the switching mechanism, since the switching mechanism is prevented from being switched to the fixed state in a state in which difference rotation occurs in the switching mechanism, great impact will no longer be applied to the switching mechanism. Herein, the predetermined value of the difference rotation of the switching mechanism may be a value, e.g., 0, at which no great impact occurs even if switching is performed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 9A and FIG. 9B illustrate a hydraulic control circuit performing switching of the two-way clutch of the automatic transmission in FIG. 1, wherein FIG. 9A shows a status when the two-way clutch is set to the fixed state, and FIG. 9B shows a status when the two-way clutch is set to the reverse rotation preventing state.

DESCRIPTION OF THE EMBODIMENTS

An automatic transmission according to the present embodiment is hereinafter explained with reference to the drawings. Although the present embodiment is an embodiment of a case where the automatic transmission is installed on a vehicle, the automatic transmission of the disclosure may also be installed on other transportation means such as a ship or an unmanned vehicle.

Figure 1:
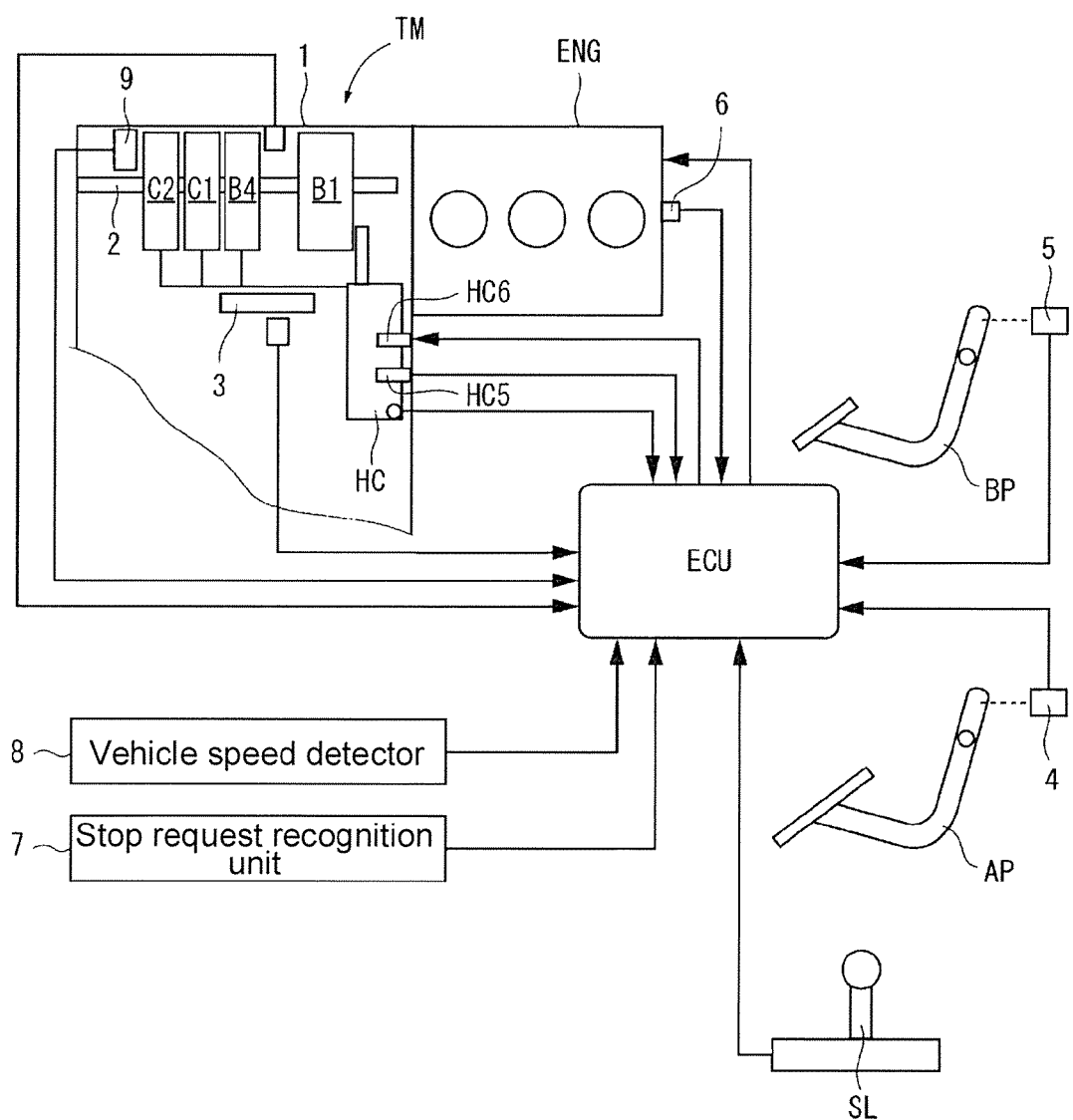
FIG. 1 is a schematic diagram showing a configuration of an automatic transmission according to an embodiment.
Figure 2:
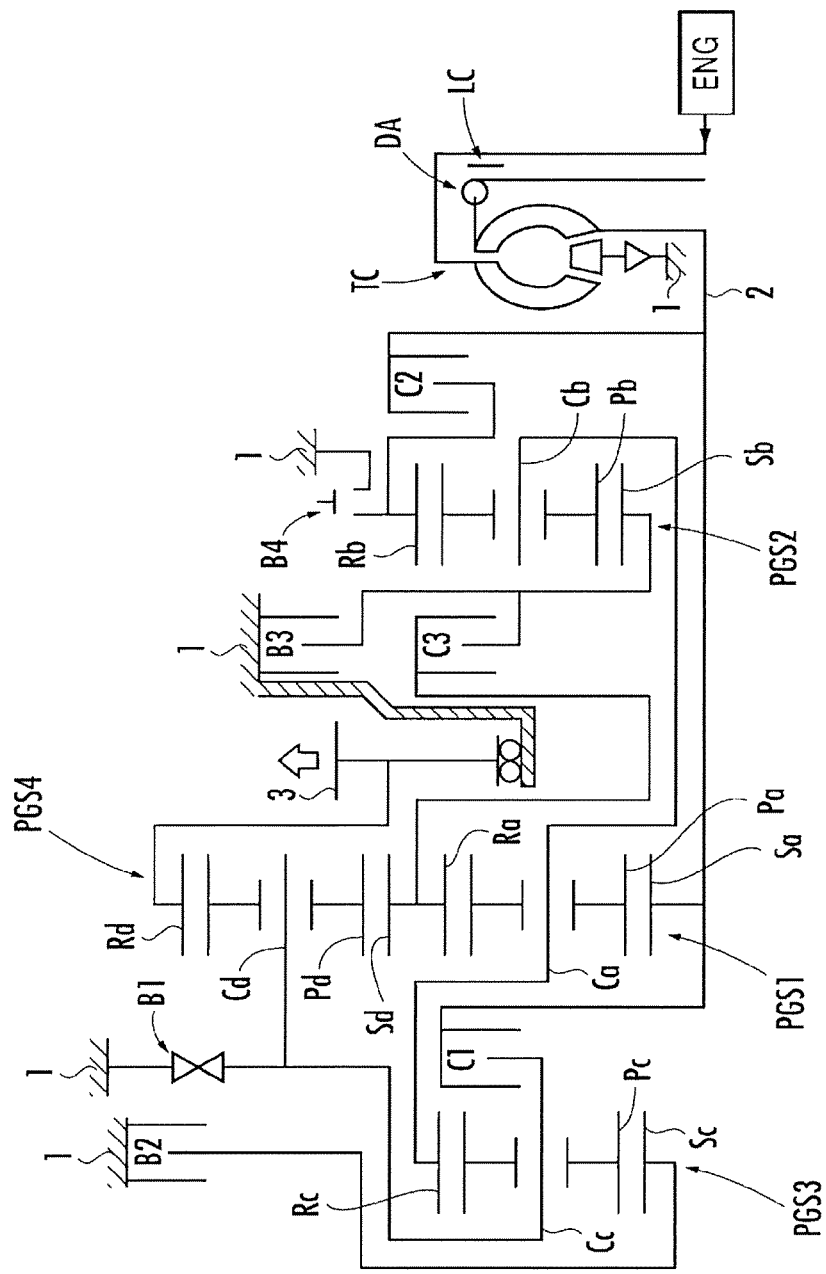
FIG. 2 is a skeleton diagram of the automatic transmission in FIG. 1.

First of all, referring to FIG. 1 and FIG. 2, a schematic configuration of an automatic transmission TM is explained. FIG. 1 is a schematic diagram showing the configuration of the automatic transmission TM. FIG. 2 is a skeleton diagram of the automatic transmission TM.

As shown in FIG. 1, the automatic transmission TM includes a transmission case 1 (casing), an input shaft 2 (input member) rotatably axially supported inside the transmission case 1, and an output gear 3 (output member) rotatably axially supported inside the transmission case 1 concentrically with the input shaft 2.

In addition, the vehicle on which the automatic transmission TM is installed includes a shift lever SL freely switching a shift position (gear position) to any of a forward drive range, a neutral drive range and a reverse drive range, an accelerator opening degree detector 4 detecting on/off of an accelerator pedal AP, and a brake pedal detector 5 detecting on/off of a brake pedal BP.

As shown in FIG. 2, a driving force outputted by a drive source ENG such as an internal combustion engine (engine) is transmitted to the input shaft 2 through a torque converter TC. The torque converter TC includes a lock-up clutch LC and a damper DA. Moreover, a single disc start clutch or a multiple disc start clutch configured to be frictionally engageable may be provided in place of the torque converter TC.

Rotation of the output gear 3 is transmitted to left and right driving wheels of the vehicle through a differential gear (not shown) or a propeller shaft (not shown).

Inside the transmission case 1, four planetary gear mechanisms, namely, a first planetary gear mechanism PGS1, a second planetary gear mechanism PGS2, a third planetary gear mechanism PGS3 and a fourth planetary gear mechanism PGS4, are arranged concentrically with the input shaft 2.

In addition, seven engaging mechanisms, namely, a first clutch C1, a second clutch C2 and a third clutch C3 as well as a first brake B1, a second brake B2, a third brake B3 and a fourth brake B4, are provided inside the transmission case 1.

Figure 3:
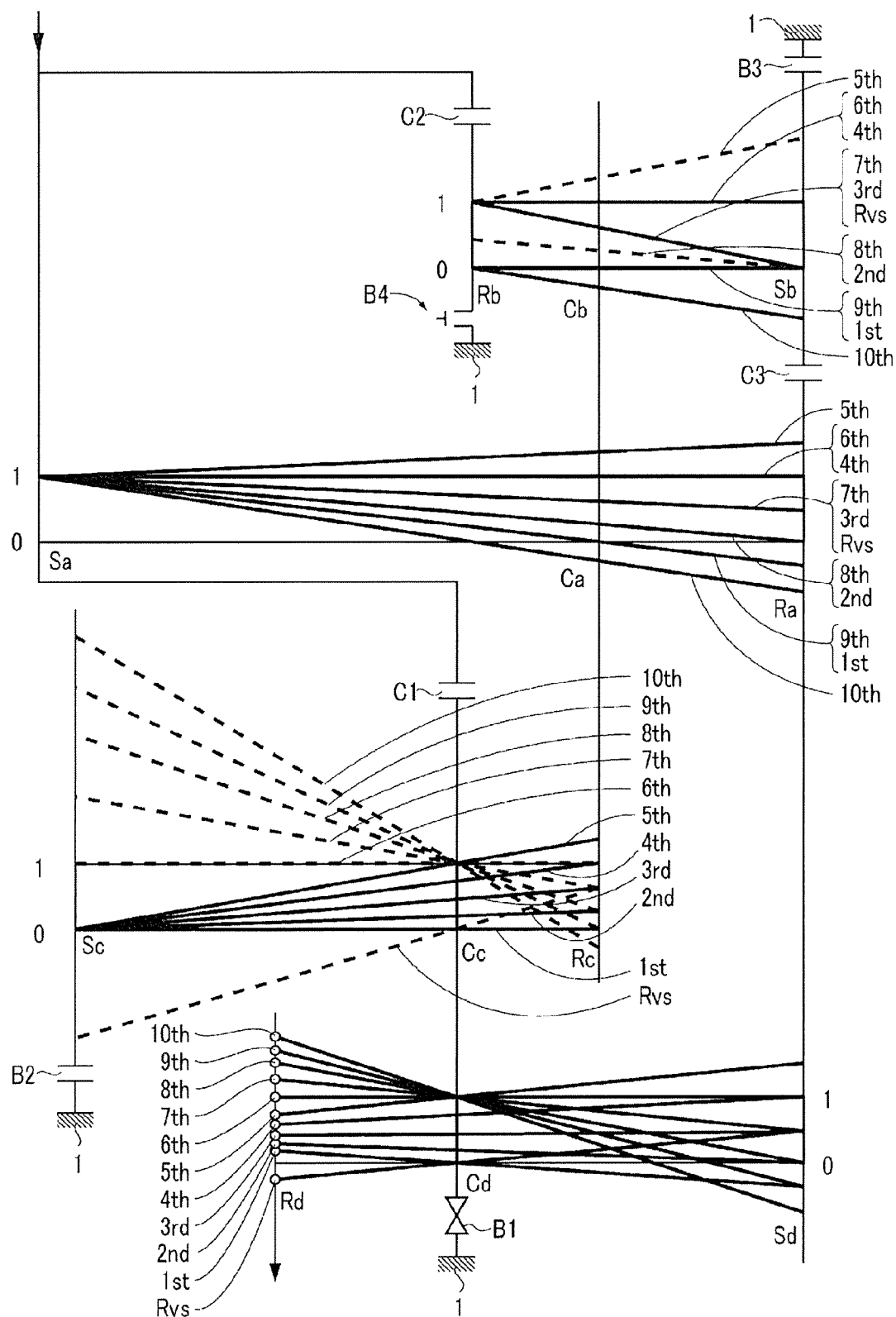
FIG. 3 is a collinear diagram of planetary gear mechanisms of the automatic transmission in FIG. 1.

Next, referring to FIG. 3, the four planetary gear mechanisms and the seven engaging mechanisms provided in the automatic transmission TM are explained.

Moreover, the collinear diagram (a drawing in which ratios of relative rotational speeds of three elements of a planetary gear mechanism can be expressed by straight lines (speed lines)) in FIG. 3 shows a collinear diagram of, in order from the top of the drawing, the second planetary gear mechanism PGS2, the first planetary gear mechanism PGS1, the third planetary gear mechanism PGS3 and the fourth planetary gear mechanism PGS4.

The first planetary gear mechanism PGS1 is configured as a so-called single pinion type planetary gear mechanism, including a sun gear Sa, a ring gear Ra, and a carrier Ca that axially supports a pinion Pa meshed with the sun gear Sa and the ring gear Ra such that the pinion Pa is rotatable about its axis and is revolvable around the sun gear Sa.

Moreover, in the single pinion type planetary gear mechanism like the first planetary gear mechanism PGS1, when the carrier is fixed and the sun gear is rotated, the ring gear rotates in a direction different from that of the sun gear. Therefore, the single pinion type planetary gear mechanism is also called a minus planetary gear mechanism or negative planetary gear mechanism. In addition, in this planetary gear mechanism, when the ring gear is fixed and the sun gear is rotated, the carrier rotates in the same direction as the sun gear.

As shown in the second section of the collinear diagram from the top of FIG. 3, let the three elements Sa, Ca and Ra of the first planetary gear mechanism PGS1 denote to respectively a first element, a second element and a third element arranged from the left side (one side) at intervals corresponding to the gear ratios (the number of teeth of the ring gear/the number of teeth of the sun gear) in the collinear diagram. Then, the first element corresponds to the sun gear Sa, the second element corresponds to the carrier Ca and the third element corresponds to the ring gear Ra.

Let h denote the gear ratio of the first planetary gear mechanism PGS1, Then, the ratio of the distance between the sun gear Sa and the carrier Ca to the distance between the carrier Ca and the ring gear Ra is set to h:1.

Similarly to the first planetary gear mechanism PGS1, the second planetary gear mechanism PGS2 is also configured as the so-called single pinion type planetary gear mechanism, including a sun gear Sb, a ring gear Rb, and a carrier Cb that axially supports a pinion Pb meshed with the sun gear Sb and the ring gear Rb such that the pinion Pb is rotatable about its axis and is revolvable around the sun gear Sb.

As shown in the first (the topmost) section of the collinear diagram from the top of FIG. 3, let the three elements Rb, Cb and Sb of the second planetary gear mechanism PGS2 denote to respectively a fourth element, a fifth element and a sixth element arranged from the left side (one side) at intervals corresponding to the gear ratios in the collinear diagram. Then, the fourth element corresponds to the ring gear Rb, the fifth element corresponds to the carrier Cb and the sixth element corresponds to the sun gear Sb.

Let i dennote the gear ratio of the second planetary gear mechanism PGS2, the ratio of the distance between the sun gear Sb and the carrier Cb to the distance between the carrier Cb and the ring gear Rb is set to i:1.

Similarly to the first planetary gear mechanism PGS1 and the second planetary gear mechanism PGS2, the third planetary gear mechanism PGS3 is also configured as the so-called single pinion type planetary gear mechanism, including a sun gear Sc, a ring gear Rc, and a carrier Cc that axially supports a pinion Pc meshed with the sun gear Sc and the ring gear Rc such that the pinion Pc is rotatable about its axis and is revolvable around the sun gear Sc.

As shown in the third section of the collinear diagram form the top of FIG. 3, let the three elements Sc, Cc and Re of the third planetary gear mechanism PGS3 denote to respectively a seventh element, an eighth element and a ninth element arranged from the left side (one side) at intervals corresponding to the gear ratios in the collinear diagram. Then, the seventh element corresponds to the sun gear Sc, the eighth element corresponds to the carrier Cc and the ninth element corresponds to the ring gear Rc.

Let j denote the gear ratio of the third planetary gear mechanism PGS3, the ratio of the distance between the sun gear Sc and the carrier Cc to the distance between the carrier Cc and the ring gear Rc is set to j:1.

Similarly to the first planetary gear mechanism PGS1, the second planetary gear mechanism PGS2 and the third planetary gear mechanism PGS3, the fourth planetary gear mechanism PGS4 is also configured as the so-called single pinion type planetary gear mechanism, including a sun gear Sd, a ring gear Rd, and a carrier Cd that axially supports a pinion Pd meshed with the sun gear Sd and the ring gear Rd such that the pinion Pd is rotatable about its axis and is revolvable around the sun gear Sd.

As shown in the fourth (the lowermost) section of the collinear diagram from the top of FIG. 3, let the three elements Rd, Cd and Sd of the fourth planetary gear mechanism PGS4 denote to respectively a tenth element, an eleventh element and a twelfth element arranged from the left side at intervals corresponding to the gear ratios in the collinear diagram. Then, the tenth element corresponds to the ring gear Rd, the eleventh element corresponds to the carrier Cd and the twelfth element corresponds to the sun gear Sd.

Let k denote the gear ratio of the fourth planetary gear mechanism PGS4, the ratio of the distance between the sun gear Sd and the carrier Cd to the distance between the carrier Cd and the ring gear Rd is set to k:1.

The sun gear Sa (the first element) of the first planetary gear mechanism PGS1 is coupled to the input shaft 2 (the input member). In addition, the ring gear Rd (the tenth element) of the fourth planetary gear mechanism PGS4 is coupled to the output gear 3 (the output member).

In addition, the carrier Ca (the second element) of the first planetary gear mechanism PGS1, the carrier Cb (the fifth element) of the second planetary gear mechanism PGS2 and the ring gear Rc (the ninth element) of the third planetary gear mechanism PGS3 are coupled to form a first coupled body Ca-Cb-Rc. In addition, the ring gear Ra (the third element) of the first planetary gear mechanism PGS1 and the sun gear Sd (the twelfth element) of the fourth planetary gear mechanism PGS4 are coupled to form a second coupled body Ra-Sd. In addition, the carrier Cc (the eighth element) of the third planetary gear mechanism PGS3 and the carrier Cd (the eleventh element) of the fourth planetary gear mechanism PGS4 are coupled to form a third coupled body Cc-Cd.

The first clutch C1 is a hydraulic-actuated type wet multiple disc friction clutch. The first clutch C1 is configured so as to be switchable between a coupled state in which the sun gear Sa (the first element) of the first planetary gear mechanism PGS1 is coupled to the third coupled body Cc-Cd and a released state in which the sun gear Sa is decoupled from the third coupled body Cc-Cd.

The second clutch C2 is a hydraulic-actuated type wet multiple disc friction clutch. The second clutch C2 is configured so as to be switchable between a coupled state in which the sun gear Sa (the first element) of the first planetary gear mechanism PGS1 is coupled to the ring gear Rb (the fourth element) of the second planetary gear mechanism PGS2 and a released state in which the sun gear Sa is decoupled from the ring gear Rb.

The third clutch C3 is a hydraulic-actuated type wet multiple disc friction clutch. The third clutch C3 is configured so as to be switchable between a coupled state in which the sun gear Sb (the sixth element) of the second planetary gear mechanism PGS2 is coupled to the second coupled body Ra-Sd and a released state in which the sun gear Sb is decoupled from the second coupled body Ra-Sd.

The first brake B1 is a so-called two-way clutch. The first brake B1 is configured so as to be switchable between a reverse rotation preventing state in which the normal rotation (rotation in the same direction as the input shaft 2) of the third coupled body Cc-Cd is allowed and the reverse rotation thereof is prevented and the fixed state in which the third coupled body Cc-Cd is fixed to the transmission case 1.

In the reverse rotation preventing state, when a force that tends to rotate the third coupled body Cc-Cd in the normal rotation direction is exerted on the third coupled body Cc-Cd, the first brake B1 allows the rotation; when a force that tends to rotate the third coupled body Cc-Cd in the reverse rotation direction is exerted on the third coupled body Cc-Cd, the first brake B prevents the rotation and fixes the third coupled body Cc-Cd to the transmission case 1.

In addition, in the fixed state, in both cases where the force that tends to rotate the third coupled body Cc-Cd in the normal rotation direction is applied and where the force that tends to rotate the third coupled body Cc-Cd in the reverse rotation direction is applied, the first brake B1 prevents the rotation and fixes the third coupled body Cc-Cd to the transmission case 1.

The second brake B2 is a hydraulic-actuated type wet multiple disc friction clutch. The second brake B2 is configured so as to be switchable between a fixed state in which the sun gear Sc (the seventh element) of the third planetary gear mechanism PGS3 is fixed to the transmission case 1 and a released state that releases this fixation.

The third brake B3 is a hydraulic-actuated type wet multiple disc function clutch. The third brake B3 is configured so as to be switchable between a fixed state in which the sun gear Sb (sixth element) of the second planetary gear mechanism PGS2 is fixed to the transmission case 1 and a released state that releases this fixation.

The fourth brake B4 is formed from a dog clutch or a meshing mechanism serving as a synchromesh mechanism that has a synchronous function. The fourth brake B4 is configured so as to be switchable between a fixed state in which the ring gear Rb (the fourth element) of the second planetary gear mechanism PGS2 is fixed to the transmission case 1 and a released state that releases this fixation.

Based on vehicle information such as vehicle travel speed, the first clutch C1, the second clutch C2 and the third clutch C3 as well as the first brake B1, the second brake B2, the third brake B3 and the fourth brake B4 are switched between the states by the control unit (control part) ECU (see FIG. 1) that contains a transmission control unit.

As shown in FIG. 2, on an axis line of the input shaft 2, the second clutch C2, the second planetary gear mechanism PGS2, the third clutch C3, the output gear 3, the first planetary gear mechanism PGS1, the first clutch C1 and the third planetary gear mechanism PGS3 are arranged in this order from the side of the drive source ENG and the torque converter TC.

The fourth brake B4 is arranged outside the second planetary gear mechanism PGS2 in a radial direction, the third brake B3 is arranged outside the third clutch C3 in the radial direction, the first brake B1 is arranged outside the first clutch C1 in the radial direction, and the second brake B2 is arranged outside the third planetary gear mechanism PGS3 in the radial direction.

In this way, in the automatic transmission TM, by arranging the four brakes outside the planetary gear mechanisms or the clutches in the radial direction, an axial length of the automatic transmission can be reduced as compared to an automatic transmission in which the brakes are arranged side by side on the axis line of the input shaft 2 along with the planetary gear mechanisms and the clutches. Moreover, the fourth brake B4 may also be arranged outside the second clutch C2 in the radial direction, and the third brake B3 may also be arranged outside the second planetary gear mechanism PGS2 in the radial direction.

In addition, the fourth planetary gear mechanism PGS4 is arranged outside the first planetary gear mechanism PGS1 in the radial direction. The ring gear Ra (the third element) of the first planetary gear mechanism PGS1 and the sun gear Sd (the twelfth element) of the fourth planetary gear mechanism PGS4 are integrally coupled to form the second coupled body Ra-Sd.

In this way, in the automatic transmission TM, by arranging the fourth planetary gear mechanism PGS4 outside the first planetary gear mechanism PGS1 in the radial direction, the first planetary gear mechanism PGS1 and the fourth planetary gear mechanism PGS4 overlap each other in the radial direction, and the axial length of the automatic transmission can be reduced.

Moreover, although the axial length can be reduced if at least a part of the first planetary gear mechanism PGS1 and a part of the fourth planetary gear mechanism PGS4 overlap each other in the radial direction, the axial length can be reduced to the minimum if the first planetary gear mechanism PGS1 and the fourth planetary gear mechanism PGS4 completely overlap each other in the radial direction.

Figures 4, 5:
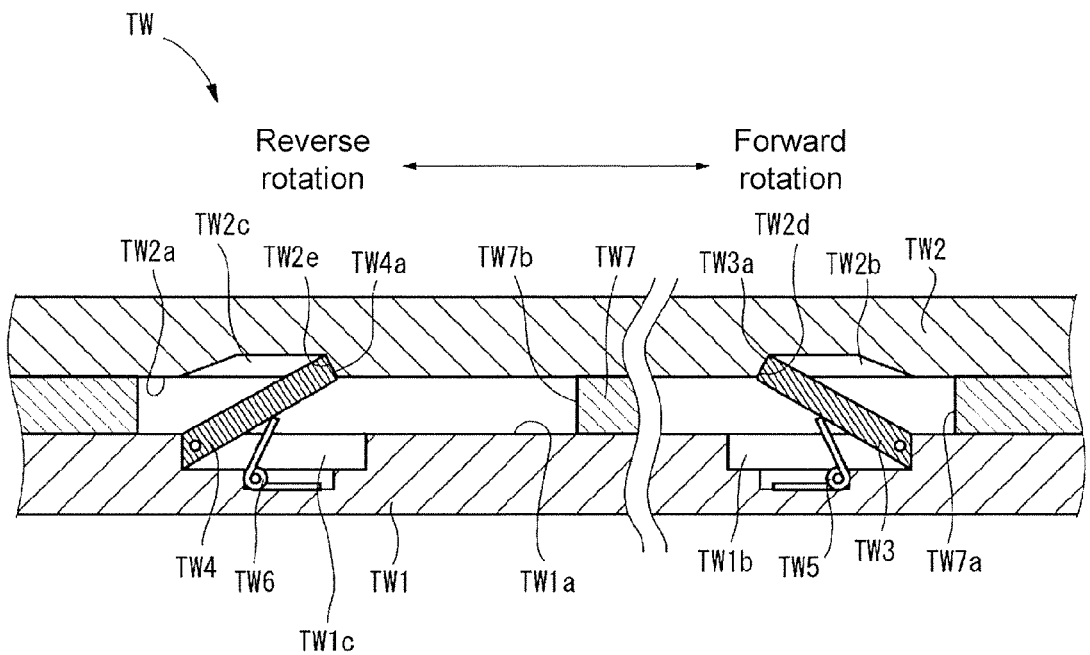
FIG. 4 illustrates states of engaging mechanisms at each gear position of the automatic transmission in FIG. 1.
FIG. 5 is a cross-sectional diagram showing a fixed state of a two-way clutch of the automatic transmission in FIG. 1.

Next, referring to FIG. 3 and FIG. 4, the states of the engaging mechanisms (i.e., the first clutch C1, the second clutch C2 and the third clutch C3 as well as the first brake B1, the second brake B2, the third brake B3 and the fourth brake B4) when establishing each gear position in the automatic transmission TM are explained.

Moreover, in the collinear diagram in FIG. 3, the lower horizontal line and the upper horizontal line (e.g., the line that overlaps the line indicated by "4th" and "$6^{th}$" in the second section of the collinear diagram of the first planetary gear mechanism PGS1 from the top of FIG. 3) respectively show that the rotational speeds are "0" and "1" (the same rotational speed as that of the input shaft 2 as the input member).

In addition, in the collinear diagram in FIG. 3, the speed lines shown in dashed lines mean that, among the first planetary gear mechanism PGS1, the second planetary gear mechanism PGS2, the third planetary gear mechanism PGS3 and the fourth planetary gear mechanism PGS4, elements of the planetary gear mechanisms other than the planetary gear mechanism that transmits power rotate (rotate idle) following the planetary gear mechanism that transmits power.

In addition, the table shown as FIG. 4 shows a summary of the states of the engaging mechanisms at each gear position, wherein the symbol "o" shows that the engaging mechanism in the corresponding column is in the coupled state or the fixed state, and a blank cell shows that the engaging mechanism in the corresponding column is in the released state.

In addition, in the table in FIG. 4, the symbol "R" in the column of the first brake B1 shows that the first brake B1 is in the reverse rotation preventing state, and the symbol "F" in the same column shows that the first brake B1 is in the fixed state.

In addition, in the table in FIG. 4, the symbol "R" with an underline indicates that the rotational speed of the third coupled body Cc-Cd or the sun gear Sc (seventh element) of the third planetary gear mechanism PGS3 becomes "0" due to the effect of the first brake B1. In addition, the symbol "R/F" indicates that the reverse rotation preventing state "R" is maintained at normal times, but the reverse rotation preventing state "R" is switched to the fixed state or the normal rotation preventing state "F" when an engine brake is activated.

As shown in FIG. 4, in the automatic transmission TM, when establishing a first gear position, the first brake B1 being a two-way clutch is set to the reverse rotation preventing state, and the second brake B2 and the third brake B3 are set to the fixed state.

By setting the first brake B1 to the reverse rotation preventing state, reverse rotation of the third coupled body Cc-Cd and the sun gear Sc (the seventh element) of the third planetary gear mechanism PGS3 is prevented, and the rotational speeds of the third coupled body Cc-Cd and the sun gear Sc (the seventh element) of the third planetary gear mechanism PGS3 become "0". The sun gear Sc (the seventh element), the carrier Cc (the eighth element) and the ring gear Rc (the ninth element) of the third planetary gear mechanism PGS3 are rendered in a lock state in which relative rotation is disabled, and the rotational speed of the first coupled body Ca-Cb-Rc that includes the ring gear Rc (the ninth element) of the third planetary gear mechanism PGS3 also becomes "0".

Accordingly, the rotational speed of the ring gear Rd (the tenth element) of the fourth planetary gear mechanism PGS4 coupled to the output gear 3 becomes "1st" shown in FIG. 3, and the first gear position is established. When engine brake is activated at the first gear position, the first brake B1 may be switched to the fixed state.

Moreover, it is not necessary to set the third brake B3 to the fixed state in order to establish the first gear position. However, the third brake B3 is set to the fixed state at the first gear position so that a gear shift can be smoothly made from the first gear position to a later-described second gear position.

When establishing the second gear position, the first brake B1 being a two-way clutch is set to the reverse rotation preventing state, the second brake B2 and the third brake B3 are set to the fixed state, and the third clutch C3 is set to the coupled state.

By setting the first brake B1 to the reverse rotation preventing state, the normal rotation of the third coupled body Cc-Cd is allowed. In addition, by setting the second brake B2 to the fixed state, the rotational speed of the sun gear Sc (the seventh element) of the third planetary gear mechanism PGS3 becomes "0". In addition, by setting the third brake B3 to the fixed state, the rotational speed of the sun gear Sb (the sixth element) of the second planetary gear mechanism PGS2 becomes "0".

In addition, by setting the third clutch C3 to the coupled state, the rotational speed of the second coupled body Ra-Sd becomes "0", same as the rotational speed of the sun gear Sb (the sixth element) of the second planetary gear mechanism PGS2.

Accordingly, the rotational speed of the ring gear Rd (the tenth element) of the fourth planetary gear mechanism PGS4 coupled to the output gear 3 becomes "2nd" shown in FIG. 3, and the second gear position is established.

When establishing a third gear position, the first brake B1 being a two-way clutch is set to the reverse rotation preventing state, the second brake B2 and the third brake B3 are set to the fixed state, and the second clutch C2 is set to the coupled state.

By setting the first brake B1 to the reverse rotation preventing state, the normal rotation of the third coupled body Cc-Cd is allowed. In addition, by setting the second brake B2 to the fixed state, the rotational speed of the sun gear Sc (the seventh element) of the third planetary gear mechanism PGS3 becomes "0". In addition, by setting the third brake B3 to the fixed state, the rotational speed of the sun gear Sb (the sixth element) of the second planetary gear mechanism PGS2 becomes "0".

In addition, by setting the second clutch C2 to the coupled state, the rotational speed of the ring gear Rb (the fourth element) of the second planetary gear mechanism PGS2 becomes "1", same as the rotational speed of the sun gear Sa (the first element) of the first planetary gear mechanism PGS1 coupled to the input shaft 2. Since the rotational speed of the sun gear Sb (the sixth element) of the second planetary gear mechanism PGS2 becomes "0" and the rotational speed of the ring gear Rb (the fourth element) of the second planetary gear mechanism PGS2 becomes "1", the rotational speed of the carrier Cb (the fifth element), i.e., the rotational speed of the first coupled body Ca-Cb-Rc, becomes i/(i+1).

Accordingly, the rotational speed of the ring gear Rd (the tenth element) of the fourth planetary gear mechanism PGS4 coupled to the output gear 3 becomes "3rd" shown in FIG. 3, and the third gear position is established.

When establishing a fourth gear position, the first brake B1 being a two-way clutch is set to the reverse rotation preventing state, the second brake B2 is set to the fixed state, and the second clutch C2 and the third clutch C3 are set to the coupled state.

By setting the first brake B1 to the reverse rotation preventing state, the normal rotation of the third coupled body Cc-Cd is allowed. In addition, by setting the second brake B2 to the fixed state, the rotational speed of the sun gear Sc (the seventh element) of the third planetary gear mechanism PGS3 becomes "0".

In addition, by setting the third clutch C3 to the coupled state, the sun gear Sb (the sixth element) of the second planetary gear mechanism PGS2 and the second coupled body Ra-Sd rotate at the same speed. At this moment, between the first planetary gear mechanism PGS1 and the second planetary gear mechanism PGS2, the carrier Ca (the second element) is coupled with the carrier Cb (fifth element), and the ring gear Ra (third element) is coupled with the sun gear Sb (sixth element). Hence, at the fourth gear position at which the third clutch C3 is set to the coupled state, one collinear diagram including four elements in the first planetary gear mechanism PGS1 and the second planetary gear mechanism PGS2 may be obtained.

In addition, by setting the second clutch C2 to the coupled state, the rotational speed of the ring gear Rb (the fourth element) of the second planetary gear mechanism PGS2 is set to "1", which is the same rotational speed as the rotational speed of the sun gear Sa (the first element) of the first planetary gear mechanism PGS1. Thus, two of the four elements formed from the first planetary gear mechanism PGS1 and the second planetary gear mechanism PGS2 have the same rotational speed "1". Accordingly, each of the elements of the first planetary gear mechanism PGS1 and the second planetary gear mechanism PGS2 is rendered in the lock state in which relative rotation is disabled, and the rotational speeds of all the elements of the first planetary gear mechanism PGS1 and the second planetary gear mechanism PGS2 are set to "1".

Accordingly, the rotational speed of the third coupled body Cc-Cd is set to j/(j+1), the rotational speed of the ring gear Rd (the tenth element) of the fourth planetary gear mechanism PGS4 coupled to the output gear 3 is set to "4th" shown in FIG. 3, and the fourth gear position is established.

When establishing a fifth gear position, the first brake B1 being a two-way clutch is set to the reverse rotation preventing state, the second brake B2 is set to the fixed state, and the first clutch C1 and the second clutch C2 are set to the coupled state.

By setting the first brake B1 to the reverse rotation preventing state, the normal rotation of the third coupled body Cc-Cd is allowed. In addition, by setting the second brake B2 to the fixed state, the rotational speed of the sun gear Sc (the seventh element) of the third planetary gear mechanism PGS3 is set to "0".

In addition, by setting the first clutch C1 to the coupled state, the rotational speed of the third coupled body Cc-Cd is set to "1", same as the rotational speed of the sun gear Sa (the first element) of the first planetary gear mechanism PGS1.

Accordingly, the rotational speed of the ring gear Rd (the tenth element) of the fourth planetary gear mechanism PGS4 coupled to the output gear 3 is set to "5th" shown in FIG. 3, and the fifth gear position is established.

Moreover, it is not necessary to set the second clutch C2 to the coupled state in order to establish the fifth gear position. However, because it is necessary to set the second clutch C2 to the coupled state for the fourth gear position and a later-described sixth gear position, the second clutch C2 is also set to the coupled state at the fifth gear position so as to smoothly perform a downshift from the fifth gear position to the fourth gear position and an upshift from the fifth gear position to the later-described sixth gear position.

When establishing the sixth gear position, the first brake B1 being a two-way clutch is set to the reverse rotation preventing state, and the first clutch C1, the second clutch C2 and the third clutch C3 are set to the coupled state.

By setting the first brake B1 to the reverse rotation preventing state, the normal rotation of the third coupled body Cc-Cd is allowed.

In addition, by setting the second clutch C2 and the third clutch C3 to the coupled state, as explained in the fourth gear position, each of the elements of the first planetary gear mechanism PGS1 and the second planetary gear mechanism PGS2 is rendered in the lock state in which relative rotation is disabled, and the rotational speed of the second coupled body Ra-Sd is set to "1". In addition, by setting the first clutch C1 to the coupled state, the rotational speed of the third coupled body Cc-Cd is set to "1". Accordingly, in the fourth planetary gear mechanism PGS4, the carrier Cd (the eleventh element) and the sun gear Sd (the twelfth element) have the same speed of "1", and each of the elements is rendered in the lock state in which relative rotation is disabled.

Consequently, the rotational speed of the ring gear Rd (the tenth element) of the fourth planetary gear mechanism PGS4 coupled to the output gear 3 is set to "1" indicated by "6th" shown in FIG. 3, and the sixth gear position is established.

When establishing a seventh gear position, the first brake B1 being a two-way clutch is set to the reverse rotation preventing state, the third brake B3 is set to the fixed state, and the first clutch C1 and the second clutch C2 are set to the coupled state.

By setting the first brake B1 to the reverse rotation preventing state, the normal rotation of the third coupled body Cc-Cd is allowed. In addition, by setting the third brake B3 to the fixed state, the rotational speed of the sun gear Sb (the sixth element) of the second planetary gear mechanism PGS2 is set to "0".

In addition, by setting the second clutch C2 to the coupled state, the rotational speed of the ring gear Rb (the fourth element) of the second planetary gear mechanism PGS2 is set to "1", same as the rotational speed of the sun gear Sa (the first element) of the first planetary gear mechanism PGS1. Thus, the rotational speed of the first coupled body Ca-Cb-Rc that includes the carrier Cb (the fifth element) of the second planetary gear mechanism PGS2 is set to i/(i+1). In addition, by setting the first clutch C1 to the coupled state, the rotational speed of the third coupled body Cc-Cd is set to "1", same as the rotational speed of the sun gear Sa (the first element) of the first planetary gear mechanism PGS1 coupled to the input shaft 2.

Accordingly, the rotational speed of the ring gear Rd (the tenth element) of the fourth planetary gear mechanism PGS4 coupled to the output gear 3 is set to "7th" shown in FIG. 3, and the seventh gear position is established.

When establishing an eighth gear position, the first brake B1 being a two-way clutch is set to the reverse rotation preventing state, the third brake B3 is set to the fixed state, and the first clutch C1 and the third clutch C3 are set to the coupled state.

By setting the first brake B1 to the reverse rotation preventing state, the normal rotation of the third coupled body Cc-Cd is allowed. In addition, by setting the third brake B3 to the fixed state, the rotational speed of the sun gear Sb (the sixth element) of the second planetary gear mechanism PGS2 is set to "0".

In addition, by setting the third clutch C3 to the coupled state, the rotational speed of the second coupled body Ra-Sd is set to "0", same as the rotational speed of the sun gear Sb (the sixth element) of the second planetary gear mechanism PGS2. In addition, by setting the first clutch C1 to the coupled state, the rotational speed of the third coupled body Cc-Cd is set to "1", same as the rotational speed of the sun gear Sa (the first element) of the first planetary gear mechanism PGS1.

Accordingly, the rotational speed of the ring gear Rd (the tenth element) of the fourth planetary gear mechanism PGS4 coupled to the output gear 3 is set to "8th" shown in FIG. 3, and the eighth gear position is established.

When establishing a ninth gear position, the first brake B1 being a two-way clutch is set to the reverse rotation preventing state, the third brake B3 and the fourth brake B4 are set to the fixed state, and the first clutch C1 is set to the coupled state.

By setting the first brake B1 to the reverse rotation preventing state, normal rotation of the third coupled body Cc-Cd is allowed. In addition, by setting the third brake B3 to the fixed state, the rotational speed of the sun gear Sb (the sixth element) of the second planetary gear mechanism PGS2 is set to "0". In addition, by setting the fourth brake B4 to the fixed state, the rotational speed of the ring gear Rb (the fourth element) of the second planetary gear mechanism PGS2 is also set to "0". Hence, the elements Sb, Cb and Rb of the second planetary gear mechanism PGS2 are rendered in the lock state in which relative rotation is disabled, and the rotational speed of the first coupled body Ca-Cb-Rc that includes the carrier Cb (the fifth element) of the second planetary gear mechanism PGS2 also is set to "0".

In addition, by setting the first clutch C1 to the coupled state, the rotational speed of the third coupled body Cc-Cd is set to "1", same as the rotational speed of the sun gear Sa (the first element) of the first planetary gear mechanism PGS1.

Accordingly, the rotational speed of the ring gear Rd (the tenth element) of the fourth planetary gear mechanism PGS4 coupled to the output gear 3 is set to "9th" shown in FIG. 3, and the ninth gear position is established.

When establishing a tenth gear position, the first brake B1 being a two-way clutch is set to the reverse rotation preventing state, the fourth brake B4 is set to the fixed state, and the first clutch C1 and the third clutch C3 are set to the coupled state.

By setting the first brake B1 to the reverse rotation preventing state, normal rotation of the third coupled body Cc-Cd is allowed. In addition, by setting the fourth brake B4 to the fixed state, the rotational speed of the ring gear Rb (the fourth element) of the second planetary gear mechanism PGS2 is set to "0".

In addition, by setting the third clutch C3 to the coupled state, the second coupled body Ra-Sd and the sun gear Sb (the sixth element) of the second planetary gear mechanism PGS2 rotate at the same speed. In addition, by setting the first clutch C1 to the coupled state, the rotational speed of the third coupled body Cc-Cd is set to "1", same as the rotational speed of the sun gear Sa (the first element) of the first planetary gear mechanism PGS1.

Accordingly, the rotational speed of the ring gear Rd (the tenth element) of the fourth planetary gear mechanism PGS4 coupled to the output gear 3 is set to "10th" shown in FIG. 3, and the tenth gear position is established.

When establishing a reverse gear position, the first brake B1 being a two-way clutch and the third brake B3 are set to the fixed state, and the second clutch C2 is set to the coupled state.

By setting the first brake B1 to the coupled state, the rotational speed of the third coupled body Cc-Cd is set to "0". In addition, by setting the third brake B3 to the fixed state and setting the second clutch C2 to the coupled state, the rotational speed of the first coupled body Ca-Cb-Rc is set to $i/(i+1)$.

Accordingly, the rotational speed of the ring gear Rd (the tenth element) of the fourth planetary gear mechanism PGS4 coupled to the output gear 3 is set to "Rvs" of reverse rotation shown in FIG. 3, and the reverse gear position is established.

In addition, FIG. 4 also shows gear position in each of the gear positions (rotational speed of the input shaft 2/rotational speed of the output gear 3) and the common ratios (the ratio of one of the gear positions to the next gear position, that is, a value obtained by dividing a given gear position that is one-step higher than the speed ratio). In FIG. 4, the gear ratio h of the first planetary gear mechanism PGS1 is set to 2.734, the gear ratio i of the second planetary gear mechanism PGS2 is set to 1.614, the gear ratio j of the third planetary gear mechanism PGS3 is set to 2.681, and the gear ratio k of the fourth planetary gear mechanism PGS4 is set to 1.914. According to this, it is known that the common ratios may be set to appropriate values.

Next, referring to FIG. 5 to FIG. 8, an example of a two-way clutch used as the first brake B1 (the switching mechanism) in the automatic transmission TM is explained.

The first brake B1 is configured as a two-way clutch switchable between the fixed state of fixing the third coupled body Cc-Cd to the transmission case 1 and the reverse rotation preventing state of allowing normal rotation of the third coupled body Cc-Cd and preventing reverse rotation thereof. As this two-way clutch, for example, a two-way clutch TW having a configuration as shown in FIG. 5 to FIG. 8 is used.

Figure 6:
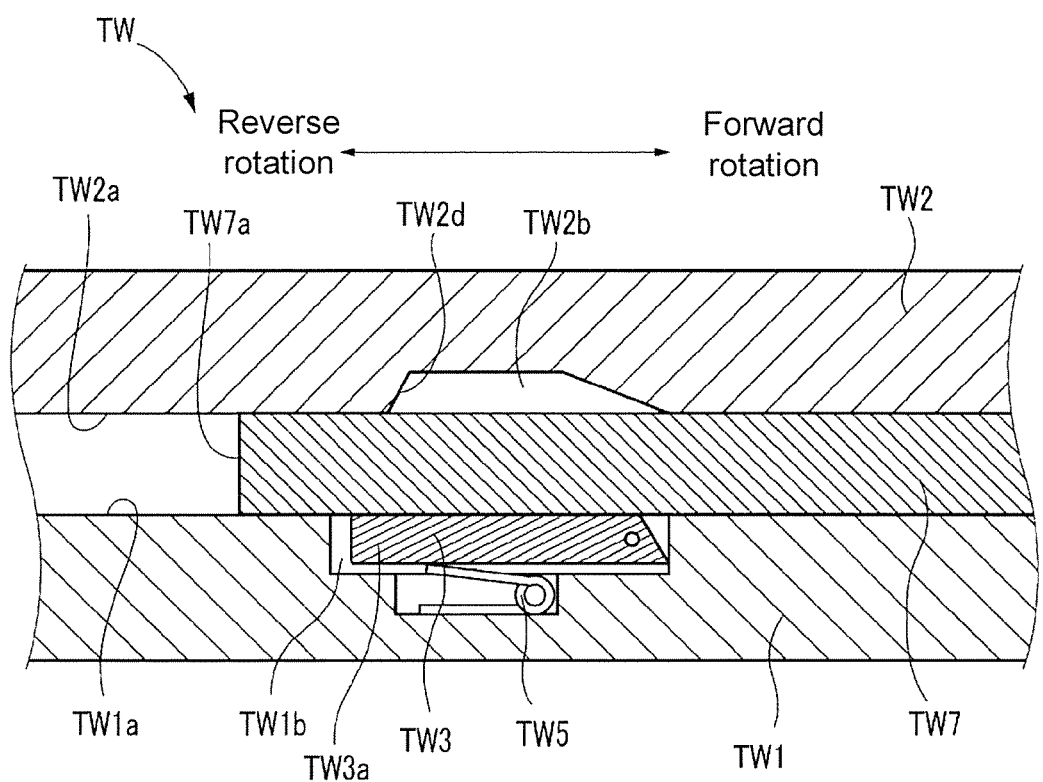
FIG. 6 is a cross-sectional diagram showing a reverse rotation preventing state of a principal part of the two-way clutch of the automatic transmission in FIG. 1.

As shown in cross-section in FIG. 5 and FIG. 6, the two-way clutch TW includes a fixed plate TW1 fixed to the transmission case 1 and a rotational plate TW2 coupled to the third coupled body Cc-Cd.

Figure 7:
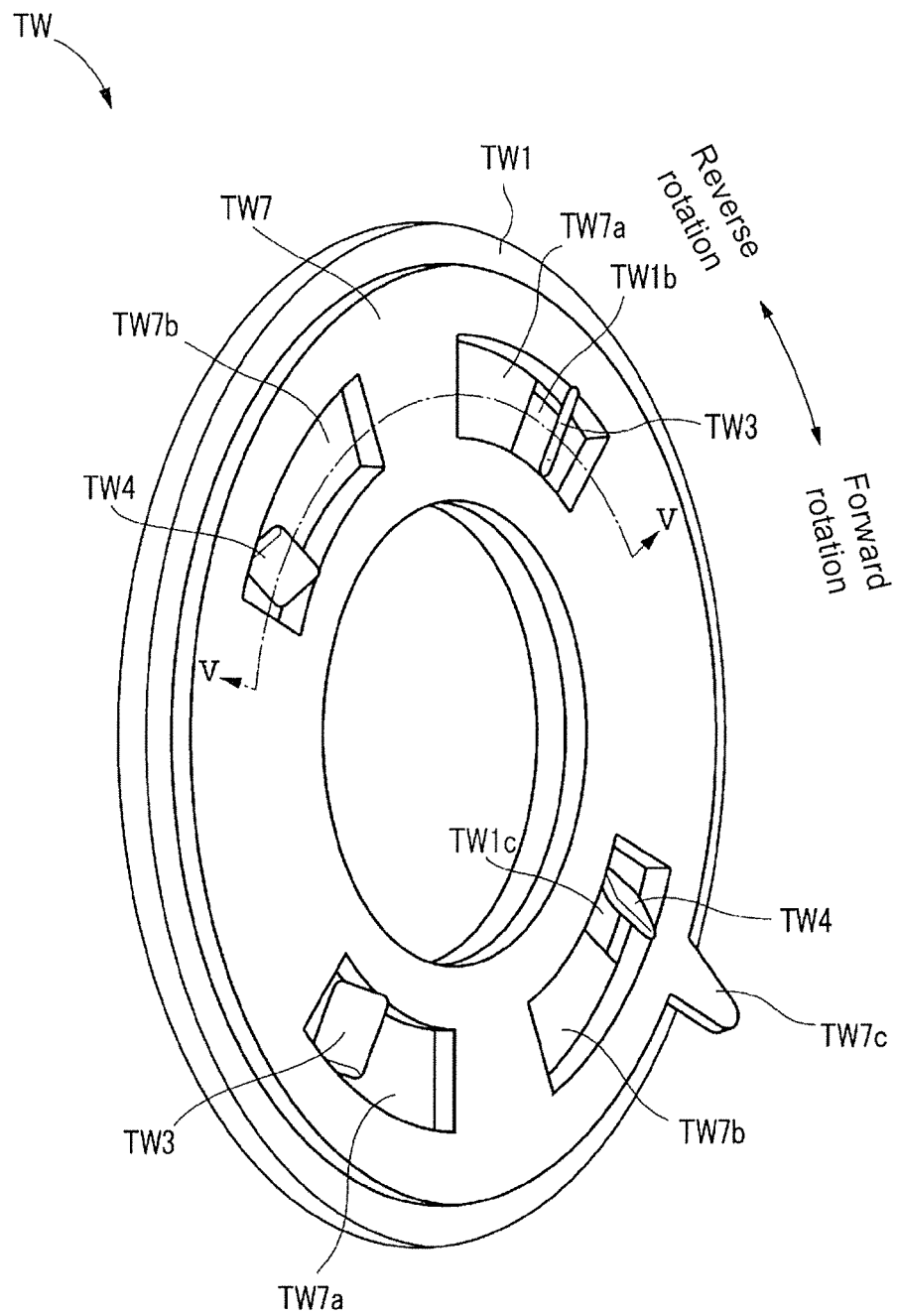
FIG. 7 is a perspective diagram showing the fixed state of the two-way clutch of the automatic transmission in FIG. 1.
Figure 8:
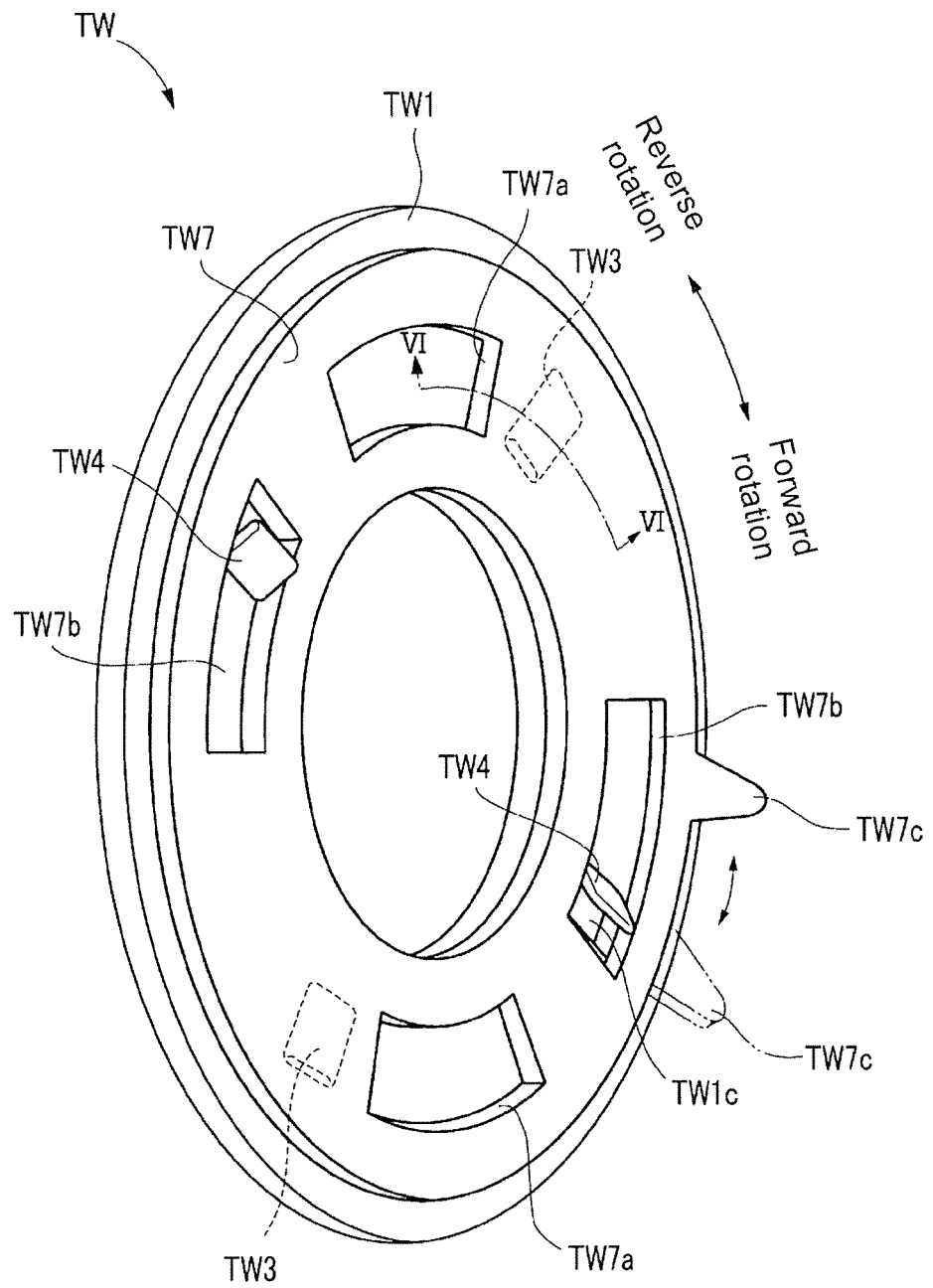
FIG. 8 is a perspective diagram showing the reverse rotation preventing state of the two-way clutch of the automatic transmission in FIG. 1.

As shown in FIG. 7 and FIG. 8, the fixed plate TW1 is formed in a ring shape (doughnut shape). In addition, although omitted in FIG. 7 and FIG. 8, the rotational plate TW2 is also formed in a ring shape (doughnut shape), similarly to the fixed plate TW1. The fixed plate TW1 and the rotational plate TW2 are arranged concentrically.

As shown in FIG. 5, on a fixed plate-side facing surface TW1a of the fixed plate TW1 facing the rotational plate TW2, a first storage unit TW1b and a second storage unit TW1c are formed as recesses. The first storage unit TW1b is arranged so as to store a plate-shaped normal rotation preventing member TW3. The second storage unit TW1c is arranged so as to store a plate-shaped reverse rotation preventing member TW4.

An end on the other side (direction in which the rotational plate TW2 rotates reversely) of the normal rotation preventing member TW3 in a circumferential direction is a swinging end TW3a. The swinging end TW3a is swingable about, as an axis, an end on one side (direction in which the rotational plate TW2 rotates normally) of the fixed plate TW1 in the circumferential direction.

An end on one side (direction in which the rotational plate TW2 rotates normally) of the reverse rotation preventing member TW4 in the circumferential direction is a swinging end TW4a. The swinging end TW4a is swingable about, as an axis, an end on the other side (direction in which the rotational plate TW2 rotates reversely) of the fixed plate TW1 in the circumferential direction.

A first spring TW5 is arranged between a bottom surface of the first storage unit TW1b and the normal rotation preventing member TW3. The first spring TW5 energizes the swinging end TW3a of the normal rotation preventing member TW3 so that the swinging end TW3a protrudes from the first storage unit TW1b.

A second spring TW6 is arranged between a bottom surface of the second storage unit TW1c and the reverse rotation preventing member TW4. The second spring TW6 energizes the swinging end TW4a of the reverse rotation preventing member TW4 so that the swinging end TW4a protrudes from the second storage unit TW1c.

On a rotational plate-side facing surface TW2a of the rotational plate TW2 facing the fixed plate TW1, a first recess TW2b is provided in a position corresponding to the normal rotation preventing member TW3. In addition, on the rotational plate-side facing surface TW2a, a second recess TW2c is provided in a position corresponding to the reverse rotation preventing member TW4.

A first engaging portion TW2d is provided in the first recess TW2b on the other side (reverse rotation direction side) of the rotational plate TW2 in the circumferential direction. The first engaging portion TW2d is formed in a step shape engagable with the swinging end TW3a of the normal rotation preventing member TW3.

A second engaging portion TW2e is provided in the second recess TW2c on one side (normal rotation direction side) of the rotational plate TW2 in the circumferential direction. The second engaging portion TW2e is formed in a step shape engagable with the swinging end TW4a of the reverse rotation preventing member TW4.

As shown in FIG. 5 and FIG. 7, when the swinging end TW3a of the normal rotation preventing member TW3 can be engaged with the first engaging portion TW2d and the swinging end TW4a of the reverse rotation preventing member TW4 can be engaged with the second engaging portion TW2e, both normal rotation and reverse rotation of the rotational plate TW2 are prevented.

Accordingly, a state in which the swinging end TW3a and the swinging end TW4a and the first engaging portion TW2d and the second engaging portion TW2e corresponding thereto are engaged with each other is the fixed state of the two-way clutch TW.

A switching plate TW7 is sandwiched between the fixed plate TW1 and the rotational plate TW2. As shown in FIG. 7 and FIG. 8, the rotational plate TW2 is also formed in a ring shape (doughnut shape). On the switching plate TW7, a first notched hole TW7a and a second notched hole TW7b are provided in positions corresponding to the normal rotation preventing member TW3 and the reverse rotation preventing member TW4.

A projection TW7c protruding outward in the radial direction is provided on an outer edge of the switching plate TW7. As shown in FIG. 8, the switching plate TW7 is swingable with respect to the fixed plate TW1.

When the switching plate TW7 is swung from the fixed state shown in FIG. 7 to the state shown in FIG. 8, the first notched hole TW7a corresponding to the normal rotation preventing member TW3 moves in the circumferential direction from the position corresponding to the normal rotation preventing member TW3. Hence, the normal rotation preventing member TW3 is pressed by the switching plate TW7, resists the energizing force of the first spring TW5 and is stored into the first storage unit TW1b (see FIG. 6). Accordingly, the engagement between the swinging end TW3a of the normal rotation preventing member TW3 and the first engaging portion TW2d is prevented. Accordingly, the rotation on the normal rotation side of the rotational plate TW2 is allowed.

On the other hand, when the switching plate TW7 is swung from the fixed state shown in FIG. 7 to the state shown in FIG. 8, the second notched hole TW7b corresponding to the reverse rotation preventing member TW4 remains in the position corresponding to the reverse rotation preventing member TW4. Hence, the reverse rotation preventing member TW4 protrudes from the second storage unit TW1c due to the energizing force of the second spring TW6, without being pressed by the switching plate TW7 (see FIG. 5). Accordingly, the swinging end TW4a of the reverse rotation preventing member TW4 is engaged with the second engaging portion TW2e. Accordingly, the rotation on the reverse rotation side of the rotational plate TW2 is prevented.

In this way, a state in which the rotation on the normal rotation side of the rotational plate TW2 is allowed and the rotation on the reverse rotation side is prevented is the reverse rotation preventing state of the two-way clutch TW.

In addition, when the projection TW7c of the switching plate TW7 is further moved to the normal rotation side from the position shown in chain double-dashed lines in FIG. 8, the second notched hole TW7b corresponding to the reverse rotation preventing member TW4 moves in the circumferential direction from the position corresponding to the reverse rotation preventing member TW4. Hence, the reverse rotation preventing member TW4 is pressed by the switching plate TW7, resists the energizing force of the second spring TW6 and is stored into the second storage unit TW1c. Accordingly, the engagement between the swinging end TW4a of the reverse rotation preventing member TW4 and the second engaging portion TW2e is prevented. Accordingly, the rotation on the reverse rotation side of the rotational plate TW2 is allowed.

On the other hand, even when the projection TW7c of the switching plate TW7 is further moved to the normal rotation side from the position shown in chain double-dashed lines in FIG. 8, the first notched hole TW7a corresponding to the normal rotation preventing member TW3 remains in the position corresponding to the normal rotation preventing member TW3. Hence, the normal rotation preventing member TW3 protrudes from the first storage unit TW1b due to the energizing force of the first spring TW5, without being pressed by the switching plate TW7 (see FIG. 5). Accordingly, the swinging end TW3a of the normal rotation preventing member TW3 is engaged with the first engaging portion TW2d. Accordingly, the rotation on the normal rotation side of the rotational plate TW2 is prevented.

In this way, a state in which the rotation on the reverse rotation side of the rotational plate TW2 is allowed and the rotation on the normal rotation side thereof is prevented is the normal rotation preventing state of the two-way clutch TW.

Figure 9A:
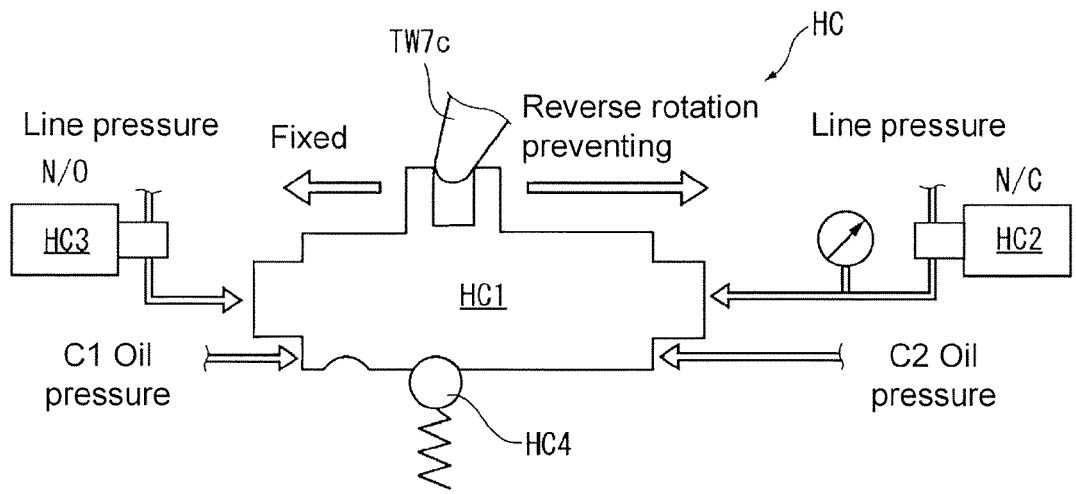
Figure 9B:
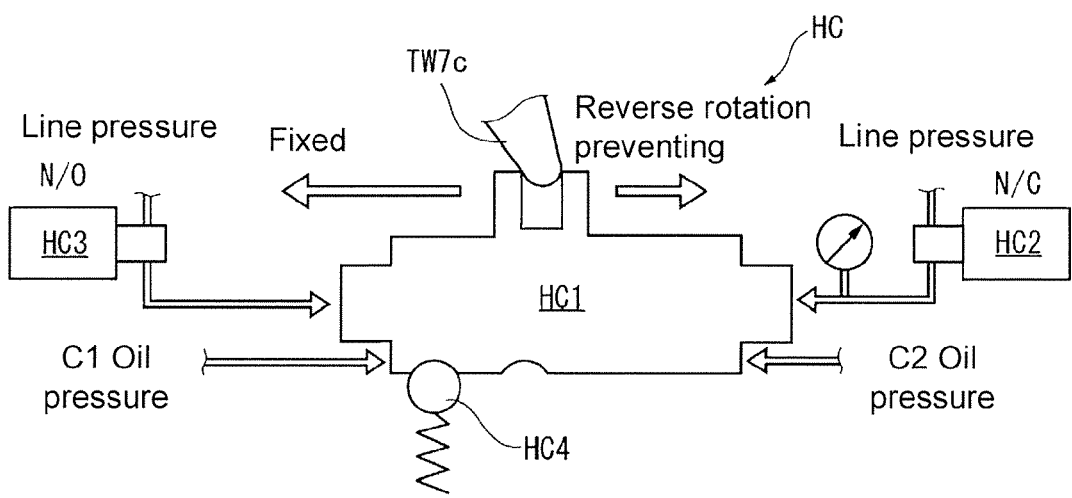

Next, referring to FIG. 9A and FIG. 9B, an example of a switching control mechanism for performing switching of an engaging mechanism in response to a signal from the control unit ECU is explained.

As shown in FIG. 9A and FIG. 9B, a hydraulic control circuit HC includes a slider HC1 engaged with the projection TW7c provided on the switching plate TW7. When the slider HC1 is located on the right side in FIG. 9A and FIG. 9B, the two-way clutch TW is switched to the reverse rotation preventing state; when the slider HC1 is located on the left side in FIG. 9A and FIG. 9B, the two-way clutch TW is switched to the fixed state.

On the right side of the slider HC1 in the drawings, a line pressure is freely supplied through a first on-off valve HC2 composed of a solenoid valve. On the left side of the slider HC1 in the drawings, a line pressure is freely supplied through a second on-off valve HC3 composed of a solenoid valve. The first on-off valve HC2 is of a normally closed (N/C) type, and the second on-off valve HC3 is of a normal open (N/O) type.

The first on-off valve HC2 and the second on-off valve HC3 open and close in response to signals from the control unit ECU. That is, the two-way clutch TW is controlled by the control unit ECU through the hydraulic control circuit HC.

In addition, on the right side of the slider HC1 in the drawings, a surface different from a line pressure receiving surface is located, to which an oil pressure supplied to the second clutch C2 is supplied. On the left side of the slider HC1 in the drawings, a surface different from a line pressure receiving surface is located, to which an oil pressure supplied to the first clutch C1 is supplied. The oil pressure of the first clutch C1 and the second clutch C2 supplied to the slider HC1 is used as RVS preparation pressure.

In addition, a detent mechanism HC4 is provided on the slider HC1, so as to prevent switching between the fixed state shown in FIG. 9A and the reverse rotation preventing state shown in FIG. 9B unless the line pressure exceeds a predetermined pressure.

According to this hydraulic control circuit HC, by opening the first on-off valve HC2, closing the second on-off valve HC3, and setting the line pressure to be equal to or higher than a predetermined switching oil pressure which is set based on a difference in oil pressure between the first clutch C1 and the second clutch C2 and an engaging force of the detent mechanism HC4, the slider HC1 is moved to the left side in the drawings, and thereby the two-way clutch TW is switched to the fixed state.

In contrast, by closing the first on-off valve HC2 and opening the second on-off valve HC3 and setting the line pressure to be equal to or higher than the predetermined switching oil pressure, the slider HC1 is moved to the right side in the drawings, and thereby the two-way clutch TW is switched to the reverse rotation preventing state.

Next, referring to FIG. 1 and FIG. 10 to FIG. 12, a control performed by the control unit ECU of the automatic transmission TM during switching of the first brake B1 (switching mechanism) being the two-way clutch TW before a stop of the drive source ENG is explained in detail.

As shown in FIG. 1, the vehicle equipped with the automatic transmission TM includes the shift lever SL freely switching the shift position (gear position) to any of the forward drive range, the neutral drive range and the reverse drive range, the accelerator opening degree detector 4 detecting on/off of the accelerator pedal AP, a drive source rotational speed detector 6 detecting a rotational speed of the drive source ENG, a stop request recognition unit 7 recognizing a stop request for the drive source ENG in response to a driver's operation, and a vehicle speed detector 8 detecting a vehicle speed.

Herein, the stop request recognition unit 7 recognizes the stop request for the drive source ENG from the driver based on on/off of a power supply for vehicles or on/off of an ignition switch.

In addition, the automatic transmission TM includes an input rotational speed detector 9 detecting a rotational speed of the input shaft 2, and the hydraulic control circuit HC supplying oil pressure to the first brake B1, the fourth brake B4, the first clutch C1 and the second clutch C2 in response to an instruction from the control unit ECU and performing switching thereof The hydraulic control circuit HC includes an oil pressure detector HC5 detecting the oil pressure supplied from the hydraulic control circuit HC, and an oil pressure control part HC6 composed of an oil pressure control valve that freely controls the oil pressure of the hydraulic control circuit HC based on information from the control unit ECU.

The control unit ECU receives shift position information from the shift lever SL, rotational speed information of the drive source ENG from the drive source rotational speed detector 6, stop request information from the stop request recognition unit 7, vehicle speed information from the vehicle speed detector 8, rotational speed information of the input shaft 2 from the input rotational speed detector 9, and oil pressure information from the oil pressure detector HC5.

In the automatic transmission TM configured in this way, a control as explained below is performed during switching of the first brake B1 (switching mechanism) being the two-way clutch TW.

Figure 10:
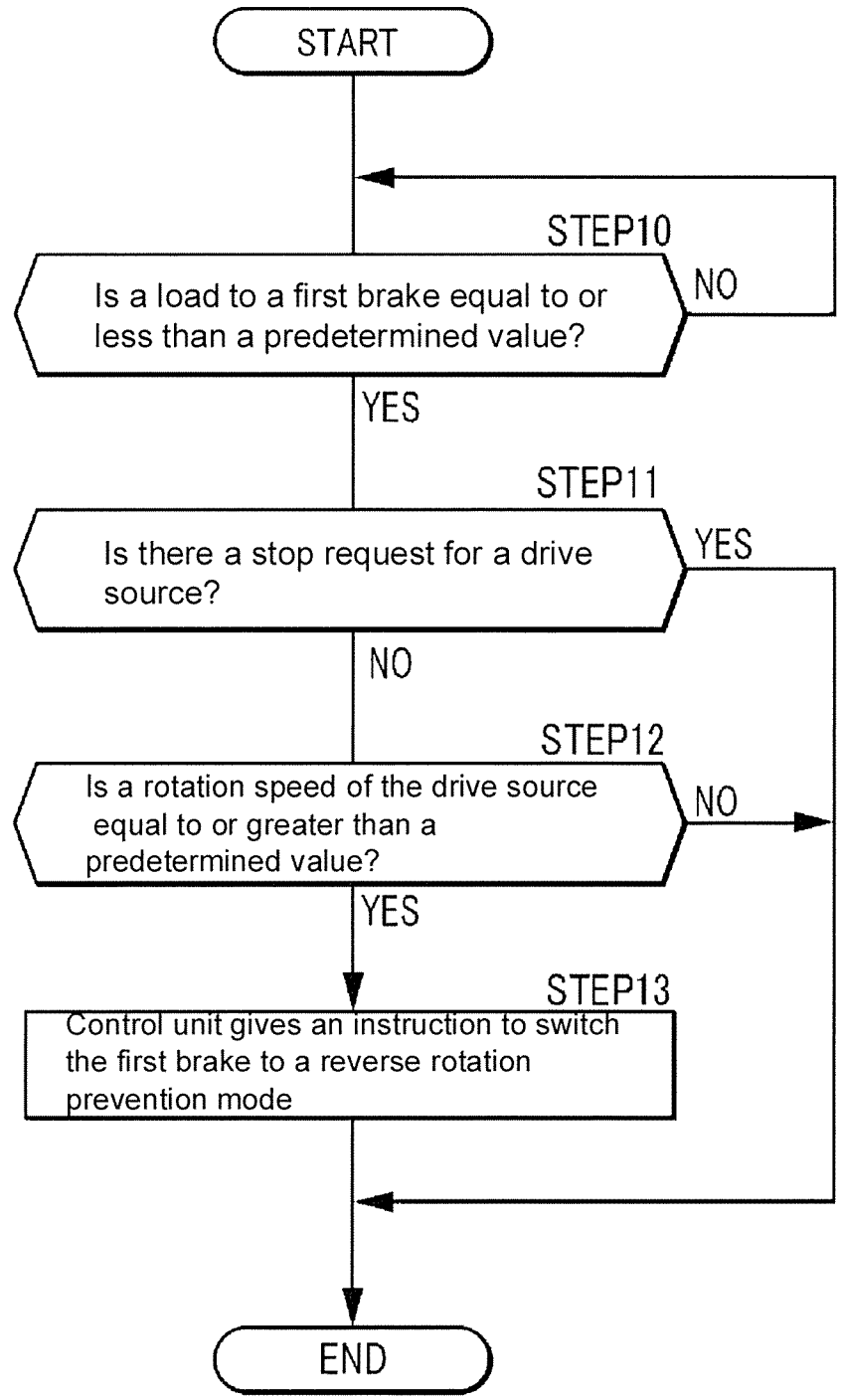
FIG. 10 is a flowchart showing a process performed by a control unit of the automatic transmission in FIG. 1 to switch the two-way clutch to the reverse rotation preventing state.

First of all, referring to FIG. 10, a control (reverse rotation preventing side switching control) performed by the control unit ECU to switch the first brake B1 being the two-way clutch TW from the fixed state to the reverse rotation preventing state is explained.

As shown in the flowchart in FIG. 10, first of all, the control unit ECU determines whether a load to the first brake B1 is equal to or less than a predetermined value (FIG. 10/STEP 10).

Specifically, the control unit ECU calculates a torque being applied to the two-way clutch TW serving as the first brake B1 based on the rotational speed of the drive source ENG or the vehicle speed and so on, and estimates a load being applied to the reverse rotation preventing member TW4 (see FIG. 5) being a component of the two-way clutch TW.

Moreover, recognition of the load applied to the reverse rotation preventing member TW4 may also be performed using other methods. For example, a strain sensor may be attached to the reverse rotation preventing member TW4, and the recognition may be performed based on a value of the strain sensor. In addition, the predetermined value in STEP10 may be a negligibly small value, e.g., 0, as compared to a load applied during switching.

If the load to the first brake B1 is neither equal to nor less than the predetermined value (NO in STEP10), the control unit ECU repeats the determination in a predetermined cycle (e.g., at intervals of 10 msec) until the load to the first brake B1 becomes equal to or less than the predetermined value.

By performing the determination in STEP10, in a state in which a great force is being applied to a component (e.g., the reverse rotation preventing member TW4) of the first brake B1, switching of the first brake B1 is prevented from being performed. As a result, not only when the drive source ENG is driven again but also during normal switching of the first brake B1, a load greater than usual is unlikely to be applied to the first brake B1. Moreover, the determination in STEP10 may also be omitted.

On the other hand, if the load to the first brake B1 is equal to or less than the predetermined value (YES in STEP10), the control unit ECU determines whether a stop request for the drive source ENG has been made (FIG. 10/STEP11).

If the stop request has been made (YES in STEP11), the control unit ECU does not perform switching of the first brake B1 and ends the process.

On the other hand, if no stop request has been made (NO in STEP11), the control unit ECU determines whether the rotational speed of the drive source ENG is equal to or greater than a predetermined value (FIG. 10/STEP12).

Moreover, the predetermined value in STEP12 may be a rotational speed of, e.g., about 500 rpm, at which the drive source ENG is unlikely to stop even if the rotational speed is maintained.

If the rotational speed of the drive source ENG is less than the predetermined value (NO in STEP12), the control unit ECU does not perform switching of the first brake B1 and ends the process.

On the other hand, if the rotational speed of the drive source ENG is equal to or greater than the predetermined value (YES in STEP12), the control unit ECU gives the hydraulic control circuit HC an instruction to switch the first brake B1 from the fixed state to the reverse rotation preventing state, and ends the process (FIG. 10/STEP13).

In this way, in a state in which the stop request for the drive source ENG is not recognized (NO in STEP11) and the rotational speed of the drive source ENG is equal to or greater than the predetermined value (YES in STEP12), the control unit ECU of the automatic transmission TM switches the first brake B1 being the two-way clutch TW.

Hence, transmission of a driving force to the first brake B1 will not be stopped before switching of the first brake B1 is completed, and the switching is prevented from becoming incomplete.

As a result, even if the drive source ENG is driven again, since the components of the first brake B1 are prevented from abutting each other in postures different from usual, a great load will not be applied locally to these components.

Figure 11:
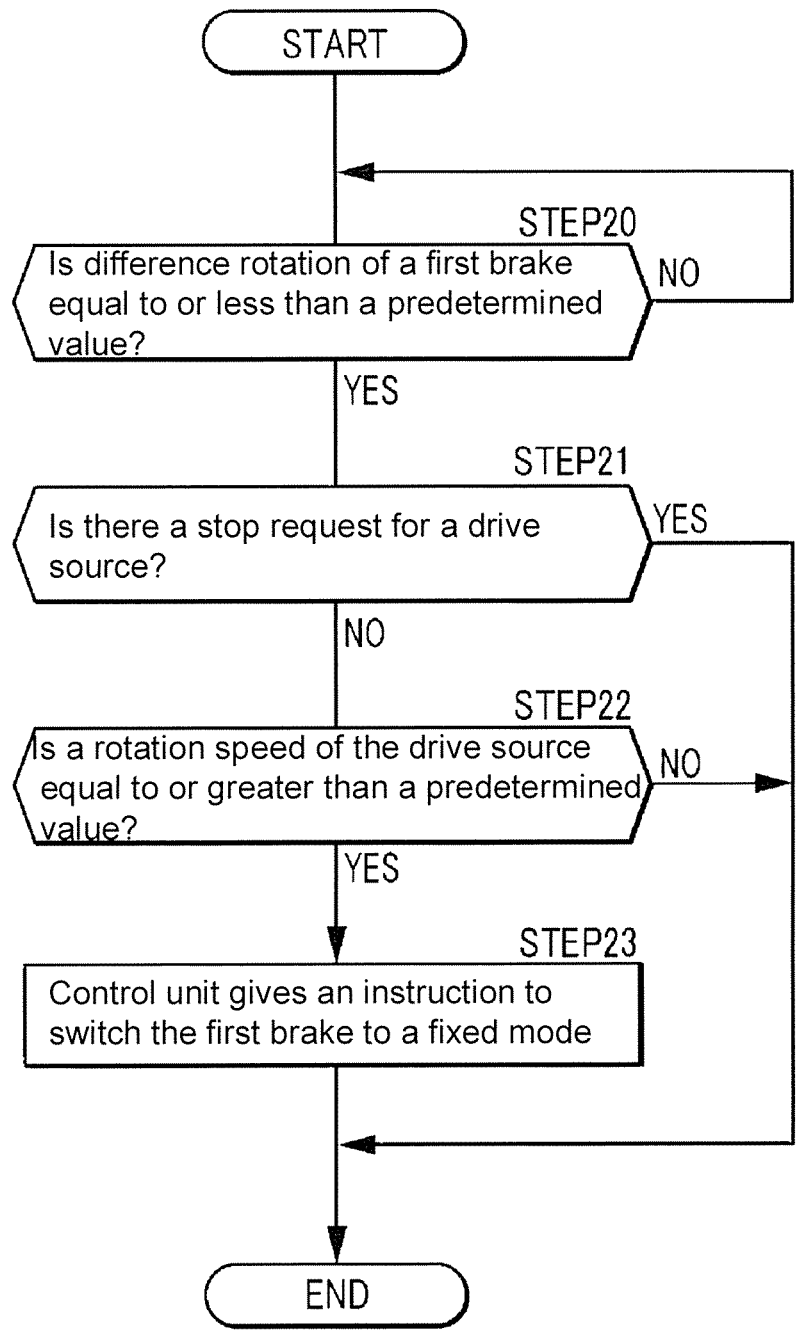
FIG. 11 is a flowchart showing a process performed by the control unit of the automatic transmission in FIG. 1 to switch the two-way clutch to the fixed state.

Next, referring to FIG. 11, a control (fixed side switching control) performed by the control unit ECU to switch the first brake B1 being the two-way clutch TW from the reverse rotation preventing state to the fixed state is explained.

As shown in the flowchart in FIG. 11, first of all, the control unit ECU determines whether difference rotation of the first brake B1 is equal to or less than a predetermined value (FIG. 1/STEP20).

Specifically, the control unit ECU calculates difference rotation of the carrier Cd (eleventh element) being an element corresponding to the first brake B1 based on the rotational speed of the input shaft 2 and so on.

Moreover, recognition of the difference rotation of the first brake B1 may also be performed using other methods. For example, the rotation of the carrier Cd may be directly measured by a sensor. In addition, the predetermined value in STEP20 may be a value, e.g., 0, at which no great impact occurs even if switching is performed.

If the difference rotation of the first brake B1 is neither equal to nor less than the predetermined value (NO in STEP20), the control unit ECU repeats the determination in a predetermined cycle (e.g., at intervals of 10 msec) until the difference rotation of the first brake B1 becomes equal to or less than the predetermined value.

By performing the determination in STEP20, in a state in which difference rotation occurs in the first brake B1, the first brake B1 is prevented from being switched to the fixed state. As a result, not only when the drive source ENG is driven again but also during normal switching of the first brake B1, great impact is unlikely to be applied to the first brake B1. Moreover, the determination in STEP20 may also be omitted.

On the other hand, if the difference rotation of the first brake B1 is equal to or less than the predetermined value (YES in STEP20), the control unit ECU determines whether a stop request for the drive source ENG has been made (FIG. 11/STEP21).

If the stop request has been made (YES in STEP21), the control unit ECU does not perform switching of the first brake B1 and ends the process.

On the other hand, if no stop request has been made (NO in STEP21), the control unit ECU determines whether the rotational speed of the drive source ENG is equal to or greater than a predetermined value (FIG. 11/STEP22).

Moreover, the predetermined value in STEP22 may be a rotational speed of, e.g., about 500 rpm, at which the drive source ENG is unlikely to stop even if the rotational speed is maintained.

If the rotational speed of the drive source ENG is less than the predetermined value (NO in STEP22), the control unit ECU does not perform switching of the first brake B1 and ends the process.

On the other hand, if the rotational speed of the drive source ENG is equal to or greater than the predetermined value (YES in STEP22), the control unit ECU gives the hydraulic control circuit HC an instruction to switch the first brake B1 from the reverse rotation preventing state to the fixed state, and ends the process (FIG. 1/STEP23).

In this way, in a state in which the stop request for the drive source ENG is not recognized (NO in STEP21) and the rotational speed of the drive source ENG is equal to or greater than the predetermined value (YES in STEP22), the control unit ECU of the automatic transmission TM switches the first brake B1 being the two-way clutch TW.

Hence, transmission of the driving force to the first brake B1 will not be stopped before switching of the first brake B1 is completed, and the switching is prevented from becoming incomplete.

As a result, even if the drive source ENG is driven again, since it is prevented that the first brake B1 is switched to the fixed state despite occurrence of difference rotation in the first brake B1, no great impact will be applied to the first brake B1.

By the way, in the automatic transmission TM, by setting an engaging mechanism other than the first brake B1 being the two-way clutch TW to the coupled state or the fixed state, the rotational speed of the element (i.e., the carrier Cd) corresponding to the first brake B1 may be made equal to or less than a predetermined rotational speed.

Then, if the rotational speed of the carrier Cd is forcibly made equal to or less than the predetermined rotational speed in this manner, switching of the first brake B1 can be promptly performed and occurrence of switch sounds can be suppressed. A state in which the engaging mechanism is switched in this manner so as to make the rotational speed of the carrier Cd equal to or less than the predetermined rotational speed is called a "reverse drive preparation state."

In the reverse drive preparation state, when the shift position is switched from the forward drive range (D range) to the reverse drive range (R range) through the neutral drive range (N range) by operation of the shift lever SL, the main processes are performed at the step in which a shift to the reverse drive range (R range) is carried out.

In the following, a control performed by the control unit ECU when the fixed side switching control is performed in the reverse drive preparation state is explained with reference to FIG. 12.

Figure 12:
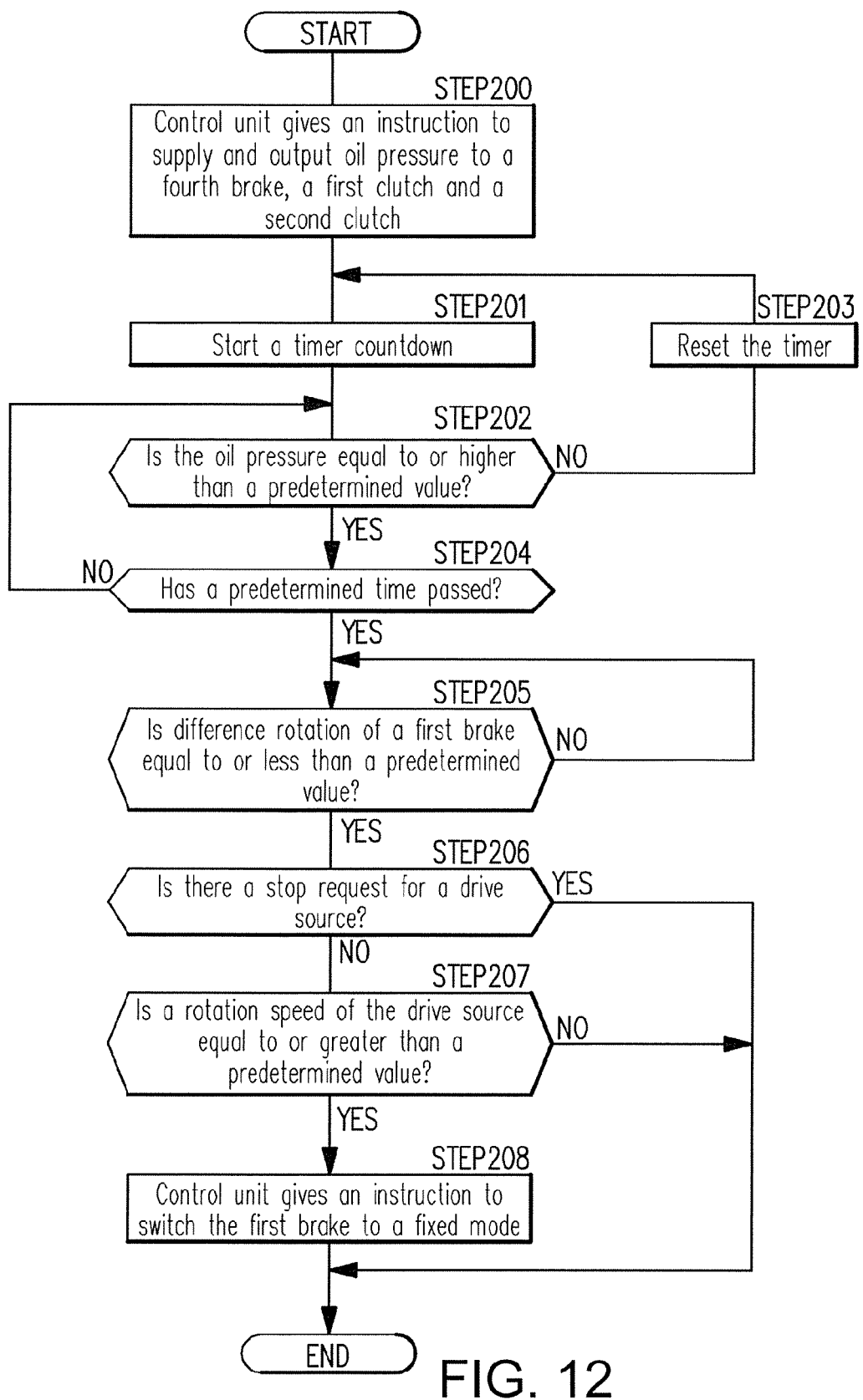
FIG. 12 is a flowchart showing a process performed by the control unit of the automatic transmission in FIG. 1 to switch the two-way clutch to the fixed state when in a reverse drive preparation state.

As shown in the flowchart in FIG. 12, first of all, in order to achieve the reverse drive preparation state, the control unit ECU gives the hydraulic control circuit HC an instruction to supply oil pressure to the fourth brake B4, the first clutch C1 and the second clutch C2 (FIG. 12/STEP200).

The reason is as follows. In the automatic transmission TM, by setting the fourth brake B4, the first clutch C1 and the second clutch C2 to a fastening state, the input shaft 2 and the carrier Cd being the element corresponding to the first brake B1 are fastened. Thus, not only the rotational speed of the input shaft 2 but also the rotational speed of the carrier Cd can be reduced.

Next, the control unit ECU starts a countdown of a timer (FIG. 12/STEP201).

Next, based on a signal from the oil pressure detector HC5, the control unit ECU determines whether the oil pressure supplied to the fourth brake B4, the first clutch C1 and the second clutch C2 is equal to or higher than a predetermined value sufficient for fastening the fourth brake B4, the first clutch C1 and the second clutch C2 (FIG. 12/STEP202).

If the oil pressure is less than the predetermined value (NO in STEP202), the control unit ECU resets the count of the timer (FIG. 12/STEP203).

After that, the control unit ECU returns to STEP201 and again starts the countdown of the timer.

On the other hand, if the oil pressure is equal to or higher than the predetermined value (YES in STEP202), the control unit ECU determines whether a predetermined time has passed (FIG. 12/STEP204).

If the predetermined time has not passed yet (NO in STEP204), the control unit ECU returns to STEP202 and again determines whether the oil pressure is equal to or greater than the predetermined value.

The control from STEP201 to STEP204 is performed for the following reason. Since the automatic transmission TM uses the hydraulic control circuit HC as the switching control mechanism for the engaging mechanism, a predetermined time is required for switching the engaging mechanism.

On the other hand, if the predetermined time has passed (YES in STEP204), the control unit ECU determines that a shift to the reverse drive preparation state is completed, and starts the fixed side switching control.

Next, the control unit ECU determines whether difference rotation of the first brake B1 is equal to or less than a predetermined value (FIG. 12/STEP205).

If the difference rotation of the first brake B1 is neither equal to nor less than the predetermined value (NO in STEP205), the control unit ECU repeats the determination in a predetermined cycle (e.g., at intervals of 10 msec) until the difference rotation of the first brake B1 becomes equal to or less than the predetermined value.

On the other hand, if the difference rotation of the first brake B1 is equal to or less than the predetermined value (YES in STEP205), the control unit ECU determines whether a stop request for the drive source ENG has been made (FIG. 12/STEP206).

If the stop request has been made (YES in STEP206), the control unit ECU does not perform switching of the first brake B1 and ends the process.

On the other hand, if no stop request has been made (NO in STEP206), the control unit ECU determines whether the rotational speed of the drive source ENG is equal to or greater than a predetermined value (FIG. 12/STEP207).

If the rotational speed of the drive source ENG is less than the predetermined value (NO in STEP207), the control unit ECU does not perform switching of the first brake B1 and ends the process.

On the other hand, if the rotational speed of the drive source ENG is equal to or greater than the predetermined value (YES in STEP207), the control unit ECU gives the hydraulic control circuit HC an instruction to switch the first brake B1 from the reverse rotation preventing state to the fixed state, and ends the process (FIG. 12/STEP208).

By combining the shift to the reverse drive preparation state with the fixed side switching control, not only great impact is prevented from being applied to the first brake B1, but also the first brake B1 can be promptly switched.

Although the above has explained the embodiment illustrated in the drawings, the disclosure is not limited to such embodiment.

For example, in the above embodiment, the automatic transmission TM is configured capable of changing gears in ten gear positions. However, the automatic transmission of the disclosure may be of any kind as long as being capable of changing gears in a plurality of gear positions.

In addition, in the above embodiment, a case has been explained where switching of the shift position is performed by operating a shift lever. However, the method for switching the shift position is not limited thereto. For example, it may be configured that the shift position is switched by pressing a button and so on. For example, it may be configured that a selected shift position is determined from a button pressing signal.

In addition, in the above embodiment, a case has been explained where the first brake being the two-way clutch TW is used as the switching mechanism switched by the hydraulic control circuit HC. However, the switching mechanism of the disclosure is not limited thereto. For example, an electromagnetic actuator may be used in place of the hydraulic control circuit, and a two-way clutch switching between the fixed state and the reverse rotation preventing state may be used.

What is claimed is:

1. An automatic transmission, comprising:
   an input member disposed inside a casing and rotated by a driving force transmitted from a drive source;
   a planetary gear mechanism having a plurality of elements rotatable inside the casing;
   a plurality of engaging mechanisms switchable to a coupled state in which the elements are coupled to one another, or switchable to a fixed state in which the elements are fixed to the casing, comprising
   a switching mechanism switchable between the fixed state and a reverse rotation preventing state that allows a normal rotation and prevents a reverse rotation of corresponding elements among the plurality of elements; an output member outputting a rotation; and
   a control part controlling the engaging mechanisms and recognizing a rotational speed of the drive source and a stop request for the drive source, wherein
   the automatic transmission is configured to output a rotation of the input member to the output member while changing speed in a plurality of gear positions with the planetary gear mechanism and the engagement mechanisms, and
   the control part switches the switching mechanism in a state in which the stop request for the drive source is not recognized and the rotational speed of the drive source is equal to or greater than a predetermined value.

2. The automatic transmission according to claim 1, wherein
   in a state in which a load being applied to the switching mechanism is equal to or less than a predetermined value, the control part switches the switching mechanism from the fixed state to the reverse rotation preventing state.

3. The automatic transmission according to claim 1, wherein
   in a state in which a difference rotation of the switching mechanism is equal to or less than a predetermined value, the control part switches the switching mechanism from the reverse rotation preventing state to the fixed state.

4. The automatic transmission according to claim 2, wherein
   in a state in which a difference rotation of the switching mechanism is equal to or less than a predetermined value, the control part switches the switching mechanism from the reverse rotation preventing state to the fixed state.

* * * * *